Sept. 25, 1951     C. W. HENDRICKS ET AL     2,569,098
PORTABLE CABLE TESTER
Filed Sept. 12, 1947
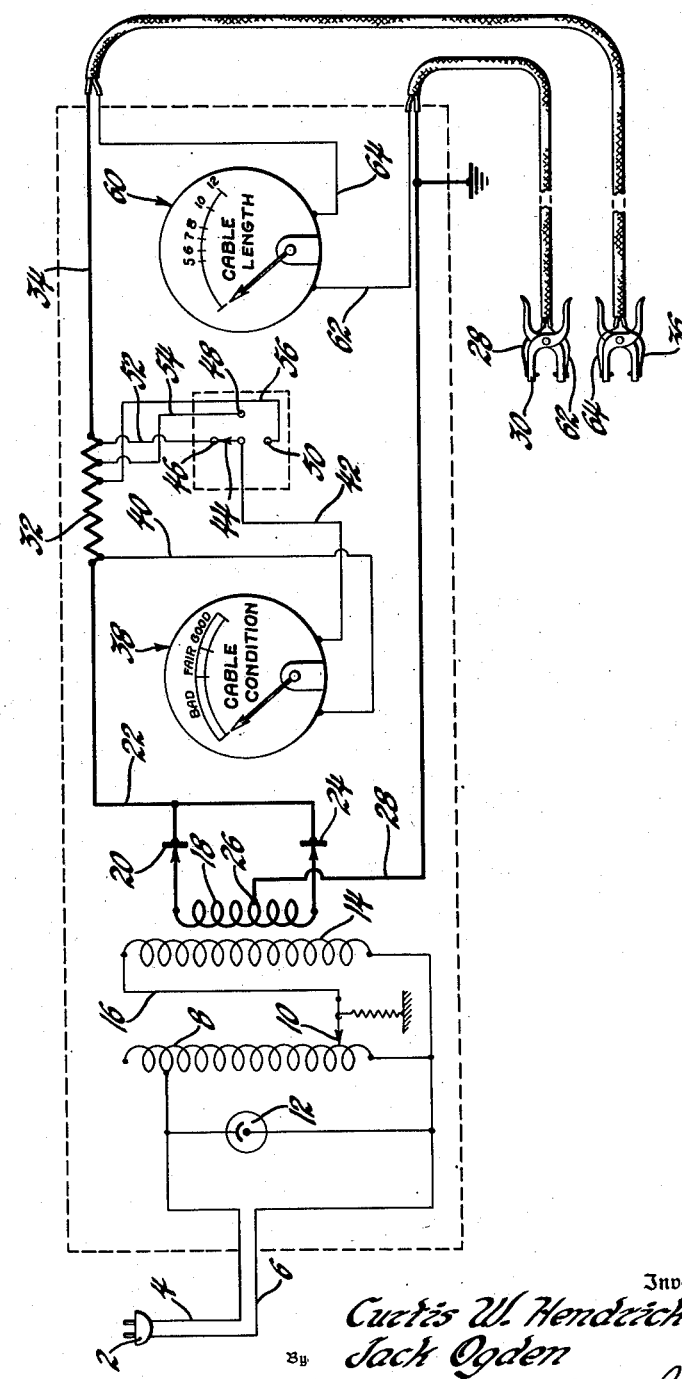
Inventors
Curtis W. Hendricks &
Jack Ogden
By Spencer, Willits, Helwig & Baillio
Attorneys Patented Sept. 25, 1951

2,569,098

UNITED STATES PATENT OFFICE 2,569,098

PORTABLE CABLE TESTER

Curtis W. Hendricks, Detroit, and Jack Ogden, Metamora, Mich., assignors to General Motors Corporation, Detroit, Mich., a corporation of Delaware Application September 12, 1947, Serial No. 773,632

3 Claims. (Cl. 175—183)

This invention relates to means for testing the electrical resistance or conductivity of cables used in electrical circuits and more particularly to a portable unit which may be easily transported and applied to the cable without removing it from its regular location. Through use, electrical conductors vary in their continued ability to conduct electric current and may reach the stage where they themselves are absorbing a much too large percentage of the total electrical power being supplied to the commercial unit being serviced thereby, such as, for example, a motor or welding machine. This is particularly true in conductors that carry high current to the operating unit, such as welders, for since the power $P=I^2R$, it can readily be seen that such a percentage as is consumed in the conductor resistance is lost power as far as the operating unit is concerned, and as R increases, these losses become appreciable. With the current normally high in the welding circuits, any deterioration in the conductivity of the cables to the units is important and the operator should know when to discard the cables.

It is, therefore, an object of our invention to provide a direct reading unit for testing conductivity of electrical cables.

It is a further object of our invention to provide a portable conductivity testing unit which can be easily and quickly applied to a cable without removing it from its regular location.

With these and other objects in view which will become apparent as the specification proceeds, our invention will be best understood by reference to the following specification and claims and the illustrations in the accompanying drawings, in which:

The figure is a circuit diagram of a system embodying our invention.

Referring more specifically to said drawing, there is shown therein a connector plug 2 for connection to the regular 110 v. A. C. supply. Two conductors 4 and 6 extend from the plug to opposite points on the coil 8 of an auto transformer, the latter having an adjustable tap 10, which can be moved over the coil to provide different output voltages. Across the lines 4 and 6 and in parallel with the coil 8 there is connected a neon indicator tube 12 to advise the operator when the device is energized. Conductor 6 continues and is connected to one end of primary winding 14 of a second transformer and the adjustable tap 10 of the auto transformer is connected through conductor 16 with the other end of primary 14. A secondary 18 is associated with the primary 14 in inductive relation, and one end of the secondary coil 18 is connected through a rectifier 20 to conductor 22, and the opposite end in like manner through a rectifier 24 to the same conductor. Secondary 18 is center tapped at 26, which tap is connected to conductor 28, the latter extending to ground, which in this instance is the case or chassis, and also to one of the application or clamping terminals 30.

Line 22 is connected to one end of a resistor 32, the opposite end being connected through conductor 34 to the other mechanical clamp terminal 36. The resistor 32 is a metering shunt and the milliammeter 38 is adapted to be connected across all or a portion of said shunt, depending upon operating conditions. Line 40, therefore, connects one end of the resistor 32 to one terminal of the meter 38. The other terminal of the meter is connected through line 42 with a movable switch contact 44, which is capable of engagement with a series of fixed contacts 46, 48 and 50, each of which is separately connected to different points on the resistance 32 by conductors 52, 54 and 56 respectively. Instead of being graduated in current digits, this particular meter is labeled "cable condition" and its scale is marked off in colored sections to indicate bad, fair and good, depending upon the current conducted.

A second meter 60 has its terminals directly connected across the applicator clamps 30 and 36 by lines 62 and 64. It will be noted that each of the cable clamps 30 and 36 has one wire extending to one jaw and the other wire to the other jaw, so that there is no common path for the currents until the actual position of clamping is reached. This second meter is, of course, a millivoltmeter, but instead of being calibrated in volts, it is calibrated in equivalents to indicate cable length. The dotted line enclosure indicates that the portion of the equipment contained therein is housed in a single casing and there extend from the casing only the two cables for applying the clamps to the cable to be tested and the plug or connector for connecting the equipment to the regular power lines.

In operation, the device is transported to the machine upon which the cables are tested, and plug 2 inserted in the 110 v. line. The two clamps 30 and 36 are then applied to opposite ends of the cable to be tested and switch 44 is turned to contact the switch point corresponding to the cross-sectional area of the cable. In commercial practice, of course, and referring now particularly to welding machines, there are certain standard cable cross-sections which are used and each of these points may be labeled and properly calibrated for one of these cross-sections, say, for example, 270,000 circular mil cable. When the switch 44 has been set upon the proper cross-section, variable tap 10 is moved along coil 8, away from the low end, and as the contact tap advances, the voltage across the cable will, of course, increase, and meter 60 will begin to swing up. The operator will continue to move the tap 10 until the meter 60 reads the proper length of cable; for example, if a cable length of 10 feet is being tested, meter 60 will be brought up until it reads 10. When this occurs, the device is balanced for the proper cross-section and proper cable length, and all that is required by the operator is to now read meter 38. If this meter reads good or fair, it indicates that over a pre-determined amount of current is being passed. If it reads bad, then the resistance is too high and the cable should be discarded. The variable tap 10 is spring biased to its lowest position for safety purposes as indicated, so that when the operator releases the same, it will move immediately to substantially no voltage position and the apparatus will be protected.

We claim:

1. In means for testing the electrical conductivity of a length of cable, a source of electrical power, auto transformer means connected to the source and having an adjustable tap, output means connected to the transformer terminating in clamping means to be applied to the ends of the cable to be tested, voltage responsive indicating means calibrated in cable lengths connected across the output so that when the adjustable tap is moved until the voltage responsive means reads the length of the cable under test a predetermined fixed incremental voltage is applied to the cable, a resistance in series with the output means having a plurality of taps, switching means connected to said taps and measuring means connected to the resistance and the switching means to indicate the current when the proper voltage is applied.

2. In means for testing the electrical conductivity of a length of cable, a source of electrical power, adjustable means for metering said power connected to the source, output means terminating in clamping means to be applied to the ends of the cable to be tested, said output means being connected to said adjustable metering means so that different voltages may be applied to said cable, voltage responsive means connected across the clamping means calibrated in feet of cable being tested so that when the adjustable metering means is moved to a point where the indicating means reads the length of cable being tested a predetermined fixed incremental voltage is applied to the cable, current measuring means connected in the output means to indicate the current flow when the cable has the fixed incremental voltage applied thereto and means to change the current measuring means to different ranges to compensate for different cable diameters.

3. In means for testing the electrical conductivity of a length of cable, a source of electrical power, an auto transformer connected to said source to provide means for supplying different amounts of power, rectifying means connected to the auto transformer, an output circuit connected to the rectifier means to be applied across the cable to be tested, voltage responsive indicating means connected across the output terminus and calibrated in cable lengths, resistance means in series in the output circuit said resistance means being tapped, switching means connected to said taps and measuring means connected to said resistance and said taps to measure the current flow, said taps being provided to adjust for different diameter cable being tested.

CURTIS W. HENDRICKS.
JACK OGDEN.

REFERENCES CITED

The following references are of record in the file of this patent:

UNITED STATES PATENTS

| Number | Name | Date |
|---|---|---|
| 754,402 | Wiseman | Mar. 8, 1904 |
| 2,188,588 | Antranikian | Jan. 30, 1940 |
| 2,310,335 | Wolfson | Feb. 9, 1943 |

FOREIGN PATENTS

| Number | Country | Date |
|---|---|---|
| 11,509 of 1903 | Great Britain | Mar. 21, 1904 |

OTHER REFERENCES

Radio News, January 1931, pages 624 and 671.
Publication: Experimental Electrical Engineering, by Karapetoff; John Wiley & Sons, 1908, pages 2 and 3.